March 29, 1960
E. M. FRANKS
2,930,287
MICROSCOPE WITH CATOPTRIC ELEMENTS
Filed July 2, 1956
3 Sheets-Sheet 1
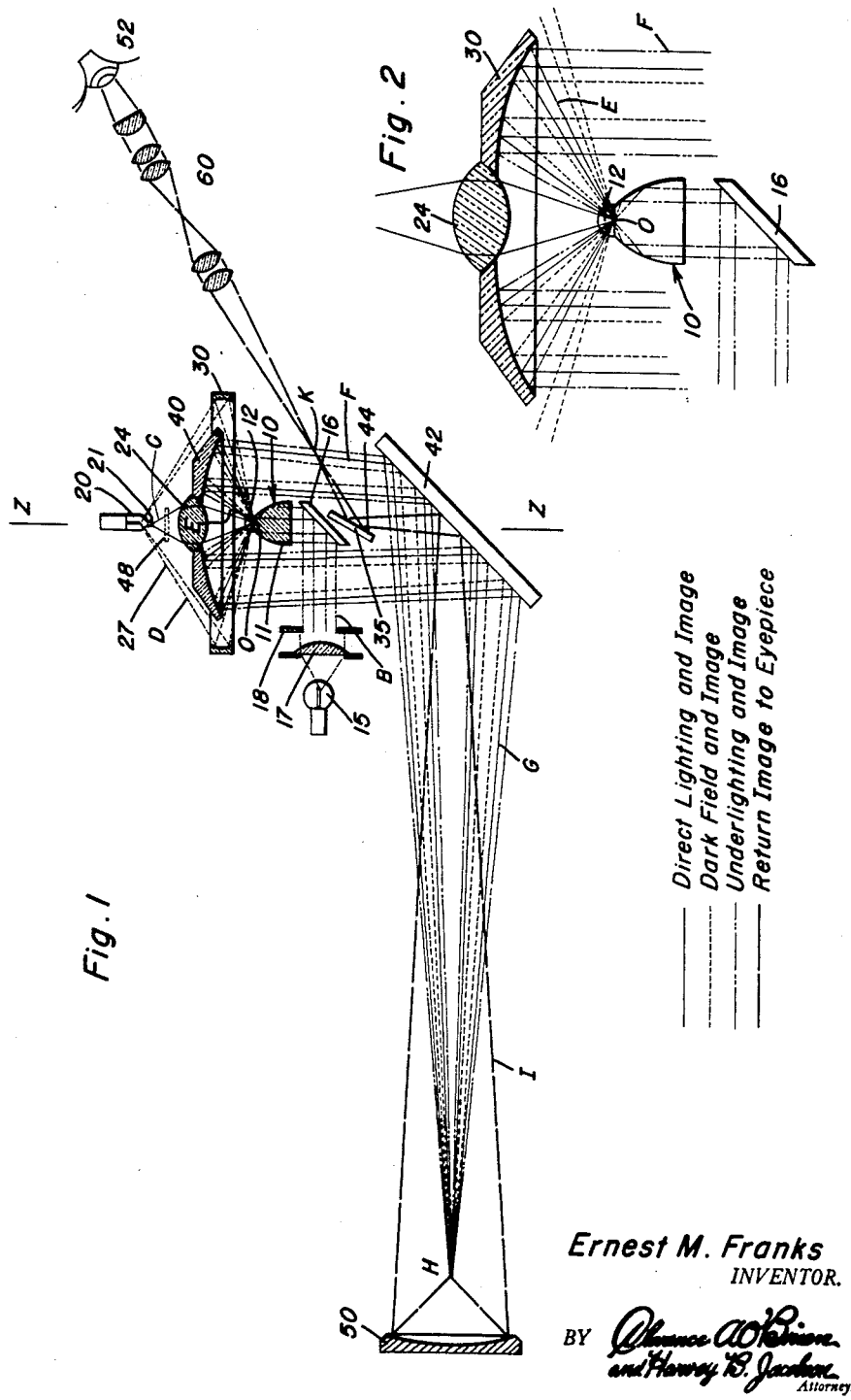
Ernest M. Franks
INVENTOR.

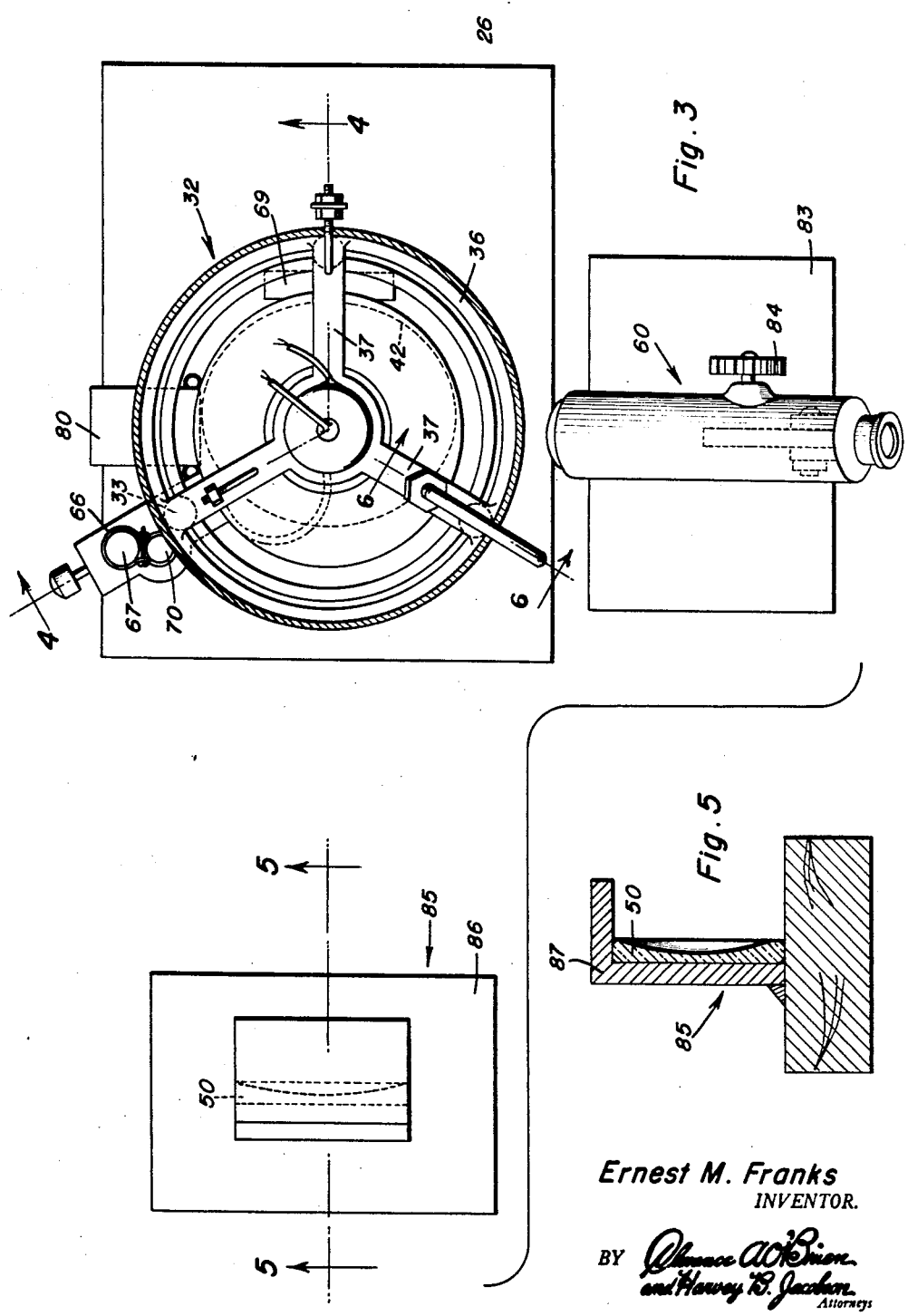

March 29, 1960  E. M. FRANKS  2,930,287
MICROSCOPE WITH CATOPTRIC ELEMENTS
Filed July 2, 1956  3 Sheets-Sheet 3

Ernest M. Franks
INVENTOR.

United States Patent Office 2,930,287
Patented Mar. 29, 1960

2,930,287

MICROSCOPE WITH CATOPTRIC ELEMENTS

Ernest M. Franks, Sacramento, Calif., assignor of twenty percent to Thomas T. Files and Donald W. McMurchie, doing business as Files & McMurchie, Sacramento, Calif.

Application July 2, 1956, Serial No. 595,234

6 Claims. (Cl. 88—39)

This invention relates to improvements in microscopy and more particularly to improvements in microscopes of the reflecting type.

It is well known that the conventional type of microscope using dioptric elements have certain limitations and drawbacks. In the first place, the loss of light in the dioptric elements of a microscope is relatively considerable thus necessitating strong illumination and making observation of objects which do not admit such illumination rather difficult. Further, the close vicinity of the objective and of the object interferes with illumination especially with illumination by reflected light.

A further disadvantage consists in the fact that it is highly desirable, for example when biological specimen are inspected, to be able to use ultraviolet light or infrared light, while the conventional dioptric lenses are not sufficiently transparent for light outside the visible part of the spectrum.

Reflective microscopes have been constructed in the beginning of the era of microscopy to overcome the disadvantage of chromatic aberration inherent in uncorrected dioptric elements, at a time at which correction had not yet been invented. In more modern times the use of catoptric elements has been proposed usually in connection with phase contrast or interference microscopes in which however the catoptric elements cooperate with dioptric elements which remain essentially those producing the magnification.

Further, reflective microscopes have occasionally been proposed in modern times on account of the superiority of the catoptric elements over refractive elements from the standpoint of spherical aberration, coma and chromatic aberration.

For various reasons, however, these suggestions were not successful. The most modern attempts combine catoptric and dioptric elements to form a single unit which is essentially achromatic and free of astigmatism and which is corrected for spherical aberration and coma. These suggestions include mostly spherical reflective elements; more specifically it was suggested that one spherical reflective element should cooperate with planar reflective elements. The obstruction coefficient is however large in such arrangements as mirrors necessarily must face each other and this reduces the numerical aperture; this makes it difficult to obtain suitable values of the numerical aperture.

A further disadvantage of most microscope constructions consists in the fact that changes in magnification are difficult to perform and in all cases such changes cannot be made without disturbing the object to be viewed. This, however, may be a major disadvantage in many cases, especially in connection with the observation of biological objects.

The invention has for its main object to provide a reflecting microscope producing high magnification which consists essentially—with the exception of the ocular—of catoptric elements and which comprises more than one curved aspherical catoptric element, so placed that a minimum of obstruction is caused.

A further object of the invention consists in providing a microscope construction equipped with a plurality of illumination systems, and more specifically equipped with a system of illumination by light reflected from the object to be observed, a system of illumination by light passing through the object and a system of dark field illumination in which the light approximately grazes the object under a small angle relatively to the plane holding the object, which illumination systems may be used singly or in any combination with each other.

A further object of the invention consists in providing a microscope construction in which the eye piece is a separate and independent unit which may be moved horizontally and vertically without disturbing the unit containing the object and the catoptric objective or objectives, thus permitting for instance to view different parts of the specimen which remains undisturbed.

A further object of the invention consists in providing an eye piece positioned so as to occupy a more comfortable angle than the angle at which the observer in conventional microscopes must use the instrument.

A further object of the invention consists in providing an image forming optical system which includes a plurality of corelated catoptric objectives, cooperating with each other by means of planar mirror surfaces, so placed within the beam of rays that the obstruction caused by the said planar reflecting surfaces is reduced to a minimum.

A further object of the invention consists in using catoptric elements consisting of glass bodies which are made reflective on the first reflecting surface so that the light does not enter the glass, thus avoiding distortion and losses due to the passage of the rays through refractive bodies.

A further object of the invention consists in mounting one of the catoptric objectives of the microscope on a carrier unit which is independent of and separate from the mount carrying the object and a first catoptric objective together with the planar mirror system, thus permitting a change of magnification and an independent horizontal or vertical movement of the said catoptric objective without disturbing the object to be observed.

A further object of the invention consists in providing a combined dark field and reflective illumination system using a single source of light for both systems parts of the rays of which are directed toward the object to be observed by lenses and part of the rays of which are reflected by an annular catoptric element surrounding a catoptric objective which thus remains unobstructed by the dark field illumination.

A still further object of the invention consists in an illumination system for transparent objects which includes a parabolic reflector the axis of which is coincident with the optical axis of the catoptric objective, said reflector serving also as an object carrier, the object being carried in a plane passing through the focus of the parabolic reflector while the illumination is produced by rays reflected in a direction which is substantially parallel to the axis of the parabolic reflector.

The invention is illustrated by way of example in the accompanying drawings showing diagrammatically one modification of the invention. It is however to be understood that the construction such as shown diagrammatically is not limitative and that a departure from the modification illustrated in the drawings is not necessarily a departure from the principle of the invention which principle is best illustrated without reference to a specific construction of the details.

In the drawings:

Figure 1 is a diagram illustrating the principle of the invention and the relative position of the various parts of the microscope.

Figure 2 is a diagram illustrating the first or primary catoptric objective element and its relation to the object carrier. It shows part of the diagram of Figure 1 on a larger scale.

Figure 3 is a plan view of the three units of the invention in an operative position.

Figure 5 is an elevational sectional view of one of the independent catoptric elements and its carrier.

Figure 4:
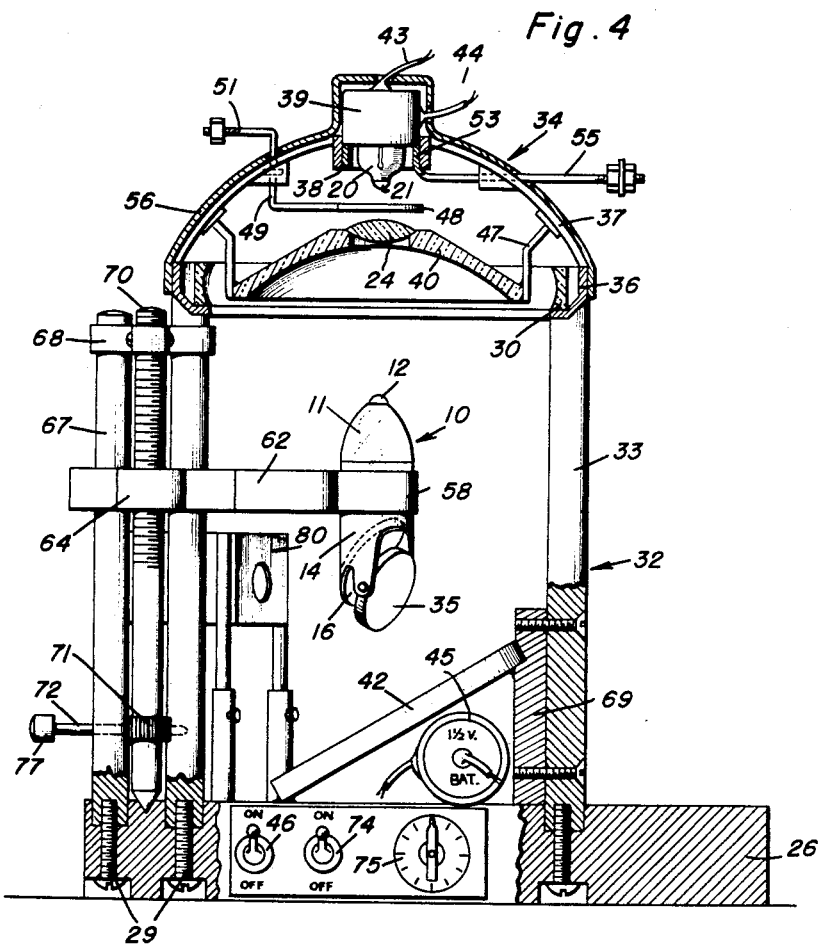
Figure 4 is an elevational view partly in section along line 4—4 of Figure 3 of the central object carrying mount.
Figure 6:
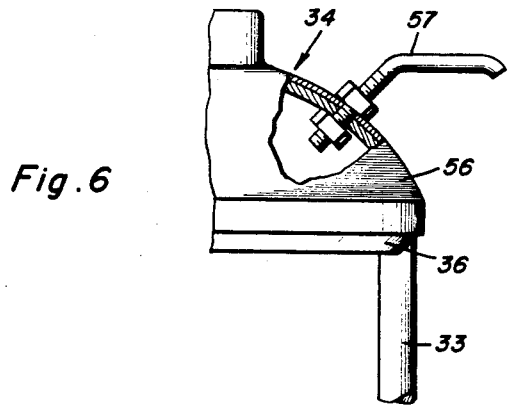
Figure 6 is an elevational view of a detail partly in section.

The principle on which the reflecting microscope according to the invention is based is best illustrated in the two diagrams shown in Figures 1 and 2. The object O is held between a parabolic reflector element 10 and a cover piece in the shape of a plano-convex lens 12. The object is illuminated by a plurality of light beams each produced by one of the illumination systems associated with the microscope, one of said systems producing direct lighting by means of light traversing the object if transparent, another system producing reflected lighting by directing a light beam towards the object which is reflected by the latter, the third system producing a dark field illumination. To produce dark field illumination the rays must be directed towards the object in such a manner that the object is merely grazed, the angle of each ray relatively to the plane in which the object is substantially held being only very small.

The lighting system for transparent objects O using light rays passing through the object, is produced by a light bulb 15 cooperating with a plano-convex lens 17 which produces a light beam B consisting of parallel rays. The light beam is indicated in the drawing, Figures 1 and 2, by lines consisting of two dots between dashes. These rays are deflected by a planar mirror element 16 and are directed towards the parabolic reflector element 10. This parabolic reflector element may consist of a parabolic glass body 11 which is made reflecting on the outside by aluminizing it outwardly. The said parabolic glass body is flattened at the top along a plane at right angles to the axis of the paraboloid and passing through the focus of the same. On top of this flat surface the object to be observed is mounted. This object is covered with a cover glass 12 which has the shape of a semi-spherical of plano-convex lens which however does not enlarge as the rays leaving the lens are at right angles to the lens surface.

It will be seen that the rays of the beam B, deflected by mirror 16 which enter the parabolic reflector element 10 in the direction of the axis of the paraboloid, are all reflected towards the focus of the said paraboloid in or near which the object O is mounted. The object is thus lighted by virtue of the concentration of the beam on the object.

An adjustable diaphragm or another beam controlling element 18 permits to regulate the width of beam B which is directed towards the object O and to concentrate the beam on a desired area.

The light bulb 15 and the lens 17 are conventional elements. The planar mirror element 16 consists only of a flat glass plate which has been aluminized on the first reflecting surface on which the light impinges. Obviously, the plate may also be made of other materials such as, for instance, of a resinous plastic, as the light does not pass through it. The mirror element 16 is arranged at 45° with respect to the optical axis of the system which is coincident with the axis of the paraboloid and which is indicated at Z—Z in the drawings.

A second lighting system for the microscope comprises the beam C lighting the object by reflected light which is indicated in full lines in the drawings Figures 1 and 2. This beam originates in a light bulb 20 which is preferably a bulb with an inbuilt lens 21 at the top from which the light emanates in a divergent bundle. The lens 21 is located at a suitable distance from the biconvex lens 24 which focuses the light on the object O.

A movable shutter 48 is indicated diagrammatically in dotted lines in Figure 1. The shutter may be inserted into the light beam in front of the lens 21 if a reflected light is not desired, as will be described more fully below.

The third lighting system is one producing a dark field illumination and it may also proceed from the light bulb 20. In this case the rays D emanating on the side of the light bulb 20 impinge on an annular reflector element 30 which is concave on the inside and which forms the reflecting surface. Also this body may be a glass body which is aluminized on the concave surface. The annular reflector element reflects the beam D towards the object at an obtuse angle to any plane passing through the optical axis Z—Z so that the reflected rays from whatever point of the reflecting element they may be thrown towards the object merely graze the object, the angle at which a ray is inclined towards the plane at right angles to the optical axis Z—Z being very small.

An arcuate or semi-circular shutter, described below, may be arranged in order to produce a one-sided lighting of the dark field system if desired.

The magnifying system of the microscope—with the exception of the eye piece—consists essentially of catoptric elements.

Above the object O and surrounding the biconvex lens 24 the main catoptric objective 40 of the microscope is arranged, this element being annular and provided with a central aperture into which the biconvex lens 24 is inserted. The catoptric element 40 collects the light beam E which emanates from the cover glass and from the object which is at the focus of the said catoptric element 40. The catoptric element has a reflecting surface which is preferably aspherical and which is carefully constructed and ground and polished in order to produce a high resolution and an image without distortion. Catoptric element 40 may consist of a glass plate which has been suitably ground and which is aluminized on the first reflecting surface so that the light does not enter the glass, thus avoiding the defects which are inherent in dioptric lenses which are due to spherical aberration, coma, astigmatism and chromatic aberration which defects, as well known, must be corrected at high expense. In fact, in order to reduce cost these defects are frequently only corrected partially.

The glass plate forming the body of the catoptric element 40 is preferably beveled on its rear face near the edges in order to allow the beam D of the dark field illumination to pass to the annular reflector 20 which surrounds the catoptric element 40. The upper surface of the said catoptric element may be flat. As already stated the biconvex lens 24 is accommodated in the central aperture of the said element 40. Attention is called to the fact that the aperture and lens as well as the element 10 have been enlarged in the drawings so that the drawing does not correspond to the actual proportions in this respect.

The reflective element 40 faces a planar reflector element 42 which is preferably arranged at an inclination of 45° with respect to the optical axis Z—Z of the catoptric objective element. The reflective element 42 reflects the beam shown at F towards a secondary catoptric objective 50 located at a distance from the optical axis.

The focal image plane of the catoptric element 40 may be at a considerable distance from the focus O in which the object is located, if high magnification is desired.

The rays indicated at G which are reflected from the planar mirror element 42 travel towards this focal image plane producing an image in the point H which coincides with the focus of the secondary catoptric element 50.

This catoptric element is again a curved aspherical reflector consisting of a glass body aluminized on the first reflecting surface. As will be explained later this catoptric element 50 froms a separate and independent unit which may be placed at any distance from the planar deflector 42. This element may be exchanged and catoptric elements of different curvature may thus be used.

The catoptric element 50 acting as a secondary objective focuses the rays projected towards it by the real image of the object O formed in point H at a distance which is larger than the distance between the catoptric element 50 and the planar mirror element 42. Therefore the last named mirror element is again used for deflecting the bundle of rays, shown in broken lines at I, which are reflected from catoptric element 50 and are deflected by the mirror element 42 in an upward direction. They impinge upon the small mirror element 35 the position of which is so adjusted that it directs the bundle of rays coming from the mirror element 42 towards the eye piece 60.

The eye piece 60 is conventional and includes a number of dioptric lenses. It is a separate and independent unit which is adjustable and which may be placed at any distance from the optical axis Z—Z without disturbing the adjustment of the object or of the catoptric elements focusing the object. As it may be displaced in any direction it may be so chosen that it allows partial inspection of the image of the object by moving it in a desired direction.

The catoptric element 50 produces a real image at point K which is viewed by the eye piece. Different eye pieces may be used or the eye piece may be provided with adjustable elements to allow a change in the magnification of the eye piece.

In view of the fact that the eye piece as well as the catoptric element 50 are separate and independent units which may be easily interchangeable the microscope is adjustable for a very wide range of magnifications. The magnification obtained by the first or primary catoptric objective is $$\frac{f_1}{f_2}$$

wherein $f_1$ and $f_2$ are the focal distances of object and image plane. The magnification produced by the second objective is $$\frac{F_1}{F_2}$$

Thus the magnification obtained is $$\frac{F_1}{F_2} \times E$$

where E is the eye piece magnification. If $$\frac{f_1}{f_2}$$

is equal to 100, $$\frac{F_1}{F_2}$$

being also 100, E being 30, a magnification of 1:300,000 is easily obtained. By changing the eye piece magnification and, if necessary, the secondary objective, obviously also low magnifications may be obtained as easily as high magnifications, without any change of the primary objective and even without disturbing the object.

The special advantage of this arrangement consists in the fact that the adjustment of the eye piece need never change, even if a change of the magnification takes place produced by changing the secondary objective 50. The bundle of rays which is reflected by the said secondary objective 50 returns towards the mirror element 42 and is reflected towards the mirror element 35 and from there towards the eye piece. As the direction in which such reflection takes place is always constant, the focus is found at the same point.

The catoptric elements, as well known, need no correction for aberration. Also the rays do not pass through glass with the sole exception of the lenses of the eye piece which must be achromatic and are best anastigmatic lenses as in conventional eye pieces.

It will also be seen that the lighting of the object is greatly improved over that obtainable in conventional microscopes. There is practically no color distortion or color absorption; the specimen is viewed in its natural colors and if desired it may be viewed in monochromatic light or in light outside the visible spectrum which light may be used for making photos. The amount of light is easily regulated. Further, by providing light from above, light from below and dark field illumination the best possible illumination or combination of illuminations may be selected without much difficulty.

The construction of the microscope is only illustrated diagrammatically and those details which are not connected with the invention have not been shown and will not be described.

The microscope consists essentially of three separate parts which will be clear when inspecting Figure 3. A common baseboard may be provided for adjustably mounting the three parts thereon but such means are not shown and are not necessary. The three main units of the microscope are indicated generally at 32, 85 and 60. The main or central portion of the microscope is formed by a central mount 32 which contains the object carrier and a means for illuminating the object together with the primary or first catoptric objective and the diagonal mirrors.

The central mount is shown in Figure 4. It comprises a top piece 34 mounted on a series of posts or pillars indicated at 33. The pillars or posts 33 are mounted on a base plate 26 and may be held on said base plate by means of screw bolts 29.

The top piece has an annular base 36 from which upwardly and radially extending curved arms 37 project which hold a central sleeve 38 concentric with the optical axis Z—Z of the objective and object carrier. The sleeve 38 holds the base or socket 39 of the light bulb 20 which has already been described and which serves for the lighting of the object by reflected light and for dark field illumination. The light bulb is energized by means of supply wires 43, 44 which are connected to the battery 45 and a switch 46. As seen in Figure 4 the light bulb is centered in the optical axis Z—Z and the light emitted along this axis passes through the plano-convex lens 21, already described, which limits the divergent bundle of light issuing at the tip of the light bulb.

The light issuing from the side of the light bulb falls on the annular concave reflector element 30, which has been previously described, and which is seated on a ledge of the annular base 36 and surrounds and is concentric with the optical axis of the microscope. This annular mirror reflects the light towards the object, the light rays reflected in the same plane from opposite sides of the annular mirror enclosing an obtuse angle, as has been described. The object carrier in Figure 4 is not shown in the position suitable for dark field illumination.

The upwardly and radially projecting curved arms carry depending brackets 47 which are attached to them and which hold the primary objective consisting of the catoptric element 40 which holds and surrounds the biconvex lens 24.

An obturating shield or screen 48 indicated in dotted lines in Figure 1, is carried by an arm which is rotatably mounted on a vertical axle 49 which is held in a suitable bearing attached to one of the curved arms 37. The axle is provided with a handle 51 which permits to swing the obturating screen 48 into position in front of the biconvex lens 24 or out of this position so as to either shut out illumination of the object by reflected light or admit such illumination.

A further arcuate screen 53 is carried by a rod 55 which may be rotated through 180° and which places the arcuate screen in such a position that it intercepts lateral rays along an arc and produces a one sided dark illumination only.

The upper portion 34 of the unit 32 may be completely covered by a dome-shaped shell 56. The handle 57 is provided to permit lifting of the entire assembly.

The object carrier 10 which is so positioned that its axis is coincident with the optical axis Z—Z of the catoptric element essentially consists of a glass body 11 which is aluminized on its outside and which has already been described. The glass body as stated has been flattened at the top along a plane which passes through the focus of the paraboloid which plane forms the object carrying platform which is covered by the cover plate 12. This assembly is mounted on or attached to a depending skirt 14 cut out in a suitable manner which carries the two diagonal mirrors 16 and 35. Mirror 16 may be fixedly carried as its position never changes while mirror 35 is preferably mounted on studs held by the skirts or by depending portions of the same and may be adjustable.

The entire assembly is preferably carried within an annular or ring-shaped holder 58 within which it may be moved around its own axis in order to permit the adjusting of the position of mirror 35. This mirror must always be in a plane bisecting the angle between the eye-piece and the axis of the secondary objective 50.

The annular holder 58 forms an extension of the curved arm 62 which projects from a slide 64 provided with guide pieces with suitable bores 66. The guide pieces by means of their bores guide the slide 64 along one of the supporting uprights or pillars 33 and along a second parallel upright 67 arranged in spaced position to one of the said posts or pillars 33 which is held on the baseboard 26 in the same manner in which the pillars are held. The two pillars 33 and 67 may be joined at the top by means of a bridge piece 68 which has a bore serving as a bearing for a threaded spindle 70 which is journaled at its other end in the baseboard 26.

The threads of the spindle 70 engage threads in the bore of the slide 64 to said slide together with the object-carrier 10 may be adjusted vertically along the optical axis Z—Z. This movement permits to focus the object relatively to the first or primary catoptric objective 40 and relatively to the lens 24 and the concave mirror 30.

In order to permit this adjustment the spindle may be rotated by means of a worm wheel 71 cut into said spindle 70 or mounted thereon which worm wheel will be engaged by a worm on spindle 72 held in suitable bores in the uprights or pillars 33 and 67, respectively.

The light bulb 15 providing the light illuminating the transparent object from below is housed in an assembly 80 adjustably supported in a suitable manner by the baseboard 26. This assembly may be arranged near a pillar assembly along which the slide 64 is moved.

The light bulb 15 is energized by a separate cricuit containing a switch 74 and a rheostat 75 which permits to regulate the intensity of the light admitted. The source of current may again be the battery 45.

The mirror 42 is fixedly mounted on the baseboard 26 having its support preferably on an upstanding panel 69 mounted on the baseboard and attached to one of the uprights or pillars 33.

As seen in Figure 3 which illustrates the three main units in operational relative position, eye piece 60 carrying the ocular lenses is a completely separate and independent unit mounted on a separate baseboard 83. This unit may be adjusted and even removed and replaced by another similar unit without touching the unit 32 carrying the object. The mounting and adjustment of the eye piece, the latter performed by means of a knob 84, is conventional and need not be described.

The secondary catoptric objective also forms a separate unit which merely consists of a baseboard 86 on which an angular holder 87 is mounted. To this holder the catoptric element 50 forming the secondary objective is attached. It is seen that said unit may be adjusted and replaced without affecting in any way the central unit 32.

In operation the object to be viewed is placed on the flat part of the paraboloid 11. It is then topped by the top cover 12. The object is then focused and according to the nature of the object (whether it is transparent or not) two or three dimensional etc. illumination of the object is selected and one or more of the three illuminating means are turned on. The focusing of the object, as already described, is effected by means of the spindle 72 and the knob 77 which moves the object to the focus O of the primary catoptric objective.

It will be noted that the bundles of light which illuminate the object are always focused on the object either by the paraboloid glass body 11 or by the lens 24 or the mirror 30.

Thereafter the eye piece 60 is brought into its operative position relatively to mirror 35 and the unit with the catoptric element 50 is also positioned, the optical axis of the catoptric element being at right angles to that of the eye piece. The distance of catoptric element 50 from the optical axis Z—Z of the unit 32 will of course correspond to the magnification selected and to the focal length of the catoptric elements.

Thereafter the eye piece is focused and adjusted and its magnification may be selected in accordance with circumstances.

A most distinctive characteristic of the microscope described is the fact is that it uses a plurality of catoptric or reflecting units as objectives, a fact the advantage of which has already been discussed. It is to be specially noted, however, that with the exception of the ocular lenses the light rays never pass through glass and the losses due to such passage are thus eliminated. It will also be seen that on account of the fact that the secondary catoptric objective is a separate unit which may be placed at any distance from the optical axis of the first or primary catoptric element, the focal distances may be rather long thus producing very high magnification. Such great length of these focal distances is made possible by the fact that the secondary catoptric element 50 sends its bundle of rays back towards the mirror from which it receives the image to be enlarged so that the position of the eye piece and observer is not in any way affected by the focal lens distance of the secondary catoptric element.

The further advantage that the object may be viewed without any change in position under different magnification and also may be inspected partially on account of the fact that the changes necessary for these operations may be effected without touching the object or its carrier, has already been mentioned.

These advantages also hold good with respect to the adjustment of the eye piece or its exchange.

It is a further advantage that an accidental disturbing of the eye piece which is always near or even in contact with the observer does not disturb the object or shake or displace the specimen. The angle at which the observer works may also be adjusted in accordance with the specific conditions and is practically independent of the adjustment of all other elements.

A further advantage consists in the fact that the reflective type objectives are fairly large objects (for instance of a size of 3 to 2½ inches) in a microscope of average magnification and therefore the production is much easier and less costly than the production of the small dioptric lenses necessary for high magnification. Further, no extra units for corrections are necessary. There is also a sufficiently large distance between the object and the primary catoptric objective for manipulation and illumination. As the light gathering power is relatively high the use of a high speed camera at the eye piece end is also possible. The value of the aperture at the end of the eye piece is still high enough to permit obtaining of instantaneous pictures produced with high speed shutters or the use of a low speed emulsion.

It has already been mentioned that catoptrics permit the use of any rays capable of being reflected, especially the use of invisible light rays. As many advantages are connected with the use of such rays this is a marked advantage over the normal dioptric lenses. In addition the possibility of cutting down the width of a light beam falling on the object permits to produce very sharply illuminated objects of the highest contrast.

Many further advantages will be recognized by the expert skilled in this art. The constructional features of the microscope as described are however variable and changes in these constructional features may be made without departing from the essence of the invention such as defined in the annexed claims.

What is claimed as new is as follows:

1. A reflecting microscope including a plurality of magnifying catoptric aspherical elements, each having two conjugate foci, adapted to concentrate the rays emerging from one focus in the second conjugate focus, comprising a first annular magnifying catoptric element and a second magnifying catoptric element arranged at a distance from each other, the long conjugate focus of said first annular catoptric element and the short conjugate focus of said second catoptric element being coincident, a ray-free space, free of rays focused in the long conjugate focus, being produced near the concave side of the annular catoptric element around the optical axis of the same, an eye piece, a first planar mirror element between said first and said second catoptric elements directing the rays from the annular catoptric magnifying element towards the second catoptric element, and also directing the rays reflected from said second catoptric element towards said eye piece, a transparent object carrier with an object carrying surface supporting an object to be magnified located in said ray-free space at such a distance from the first annular catoptric element that the center of the object carrying surface of the object carrier is coincident with the short conjugate focus of the first annular catoptric element, the eye piece being focused on the long conjugate focus of the second catoptric magnifying element and being arranged at an angle to the optical axis of the first annular catoptric element, a further planar mirror arranged in the ray-free space of the said first annular catoptric element, said further mirror receiving the rays reflected from the second catoptric element and the first planar mirror and deflecting them towards the eye piece and illuminating means for producing a diascopic illumination of the object, said means including a source of light and means directing light from said source of light through the transparent object carrier to the object to be viewed in diascopic illumination.

2. A reflecting microscope with a plurality of magnifying catoptric aspherical elements each provided with two conjugate foci and adapted to concentrate rays emerging from one focus in the second conjugate focus, comprising a first annular catoptric element and a second catoptric element, cooperating with said first catoptric element, said catoptric magnifying elements being so arranged with respect to each other that the long conjugate focus of the first annular catoptric magnifying element and the short conjugate focus of the second catoptric magnifying element are coincident, a ray-free space, free of rays reflected from the annular catoptric element towards the long conjugate focus being formed on one side of the first annular catoptric element around the optical axis thereof, a transparent object carrier with an object carrying surface at one end arranged in said ray-free space, the transparent object carrier being a massive transparent paraboloid with inwardly reflecting paraboloidal surfaces, truncated by a plane passing through the focus of the paraboloid, the latter being coincident with the focus of the first annular catoptric element and with the center of the object carrying surface, the axis of the object carrier being coincident with the optical axis of the first annular catoptric element, illuminating means, including a source of light, arranged outside of the bundle of rays directed by the annular catoptric element towards its long conjugate focus, for illuminating transparent and translucent objects, deflecting means arranged in the ray-free space directing the rays from the source of light towards said transparent object carrier in substantial parallelism to the axis of the same, said rays after passing the paraboloidal object carrier being inwardly reflected at the paraboloidal end surface of the same and being concentrated in the coincident foci of the paraboloid and the first annular catoptric element, and an ocular focused on the long conjugate focus of the second catoptric magnifying elements.

3. A reflecting microscope with a plurality of cooperating magnifying aspherical catoptric elements, each having two conjugate foci, the rays passing through one of the conjugate foci being concentrated in the other conjugate focus, comprising a first annular catoptric element and a second magnifying catoptric element, so arranged relative to each other that the long conjugate focus of said first annular catoptric element is coincident with the short focus of the said second catoptric magnifying element, a planar mirror facing both catoptric elements and directing the rays from one of them towards the other, the optical axes of said catoptric elements being thus at an angle with respect to each other, the annular shape of the first catoptric element entailing a space free of rays converging towards the long conjugate focus of the same, an object carrier with an object carrying surface arranged in the said ray-free space, an eye piece with an optical axis at an angle to the optical axis of the first annular catoptric element, a second planar reflecting means arranged in the ray-free space and facing said first planar reflecting means, the said first planar reflecting means reflecting simultaneously the rays received from the first annular catoptric element directed towards the second catoptric element and the rays received from the latter, the last-named rays being directed towards the second planar reflecting means which deflect the rays towards the eye piece.

4. A reflecting microscope as claimed in claim 3 comprising three mechanically independent units, the first unit being formed by the first annular catoptric element, the object carrier and the first and second planar reflecting means, the second independent unit being formed by the second catoptric element and the third independent unit benig formed by the eye piece, thus enabling an operator to make adjustment of the eye piece and adjustment of the object without disturbing the adjustment of the other optical elements of the microscope.

5. A reflecting microscope including a plurality of cooperating magnifying catoptric elements, each element being aspherical with two conjugate foci, the rays passing through one of the foci being reflected towards the other focus comprising a first annular catoptric element provided with a central opening, a second catoptric magnifying element mounted independently of and at a distance from the first catoptric element, said distance being equal to the sum of the long conjugate focal distance of the first annular catoptric element and the short conjugate focal distance of the second catoptric magnifying element, the long conjugate focus of the first annular catoptric element and the short focus of the second catoptric element being coincident, a space free of rays converging towards the long conjugate focus being formed by the central opening of the first annular catoptric element on one side of the same, a transparent object carrier arranged coaxially with the optical axis of the first catoptric annular element within the ray-free space, having an object carrying surface at right angles to the said optical axis of the first annular catoptric element, said surface being so placed that the short conjugate focus of the first annular catoptric element is coincident with the center of said surface, means for providing an alternative and a simultaneous diascopic, episcopic and dark field illumination of the object, said means including a source of light arranged in the axis of the first annular catoptric element on the back side of the same, a dioptric lens element in the center of the said first annular catoptric element focused on the center of the object carrying surface, the rays passing through a dioptric lens thus producing an illumination by reflected light, a catoptric concave dark field illuminating member surrounding said first annular catoptric element and said object carrier, receiving the lateral rays from the last-mentioned source of light and focussing the same on the object carrier, said concave catoptric dark field illumination member being so placed that the rays reflected from the same arrive under a small angle with respect to the object carrying surface, thus producing dark field illumination, and a further source of light arranged laterally at a distance from the axis of the first annular catoptric element, directing its ray towards the said axis, a mirror element in the ray-free space surrounding the axis of the said first annular catoptric element directing the rays of the said second source of light axially through the transparent object carrier to the object carrying surface to produce diascopic illumination of the same, and an ocular focused on the long conjugate focus of the second catoptric element.

6. A reflecting microscope with catoptric aspherical elements each having two conjugate foci and with a plurality of illuminating means adapted for alternative and simultaneous operation comprising a first annular catoptric magnifying element provided with a central opening, a second catoptric magnifying element arranged at a distance from the first annular magnifying catoptric element, the long conjugate focus of the first annular catoptric element being coincident with the short conjugate focus of the second catoptric magnifying element, a transparent object carrier arranged coaxially with the first annular catoptric magnifying element between said first and said second catoptric elements, having the shape of a paraboloid with inwardly reflecting surfaces and with an object carrying planar surface passing through the focus of the said paraboloid on one end, said paraboloid focus and the center of the object carrying surface being coincident with the short conjugate focus of the first annular catoptric magnifying element, said paraboloidal object carrier having a further surface at the other end substantially parallel to the object carrying surface, the first annular catoptric magnifying element thus forming an objective, in the short focus of which the object is placed, the real image of said object being produced in the long conjugate focus which is also the short conjugate focus of the second catoptric element, so that the object is again magnified by the latter after reflection, an eye piece the focus of which is coincident with the long conjugate focus of the second catoptric element, an annular catoptric illuminating element surrounding the first annular catoptric magnifying element and focused on the focus of said first annular catoptric magnifying element, a dioptric lens element in the central opening of the first catoptric magnifying element having an optical axis coincident with the optical axis of the first annular catoptric element, a source of illumination provided with means for emitting rays in the axial direction and in a lateral direction in a circle, said source of illumination being arranged in the common axis of the first annular catoptric magnifying element and the annular catoptric illuminating element and the dioptric lens element, the rays from said source of light thus illuminating the object through the dioptric lens element and through the catoptric illuminating element, the latter being arranged in such position that the reflected rays strike the object carrying surface under a small angle thus producing dark field illumination, while the dioptric lens element is focused on the object so that the object may be illuminated either by one or by both illuminating means, a second source of light, a planar mirror element facing the wider end of the transparent paraboloidal object carrier, axially positioned to direct light to the object carrier along the axis of the paraboloidal object carrier.

References Cited in the file of this patent

UNITED STATES PATENTS

| 1,943,510 | Bauersfield | Jan. 16, 1934 |
| 1,985,072 | Bauersfield | Dec. 18, 1934 |
| 2,156,911 | Brown | May 2, 1939 |
| 2,157,437 | Shipley | May 9, 1939 |
| 2,218,270 | Snook | Oct. 15, 1940 |
| 2,478,762 | Johnson | Aug. 9, 1949 |
| 2,593,724 | Bouwers | Apr. 22, 1952 |

FOREIGN PATENTS

| 383,100 | Great Britain | Nov. 10, 1932 |
| 697,586 | Great Britain | Sept. 23, 1953 |